(12) United States Patent
Smith

(10) Patent No.: US 6,856,514 B2
(45) Date of Patent: Feb. 15, 2005

(54) TOOLLESS THUMB SCREW WITH ADJUSTABLE HEIGHT KNOB

(75) Inventor: Kelly K. Smith, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/694,121

(22) Filed: Oct. 27, 2003

(65) Prior Publication Data
US 2004/0086332 A1 May 6, 2004

Related U.S. Application Data

(63) Continuation of application No. 10/017,958, filed on Dec. 14, 2001, now Pat. No. 6,669,423.

(51) Int. Cl.⁷ .................................................. G08F 1/20
(52) U.S. Cl. ..................... 361/726; 439/928.1; 411/396; 312/223.3
(58) Field of Search ................................. 361/724–727, 361/685–687; 312/223.1–223.6, 345; 439/928.1; 360/137 D; 292/341.15, 302; 411/373, 396, 409

(56) References Cited

U.S. PATENT DOCUMENTS

| | | |
|---|---|---|
| 3,155,412 A | 11/1964 | Edgar |
| 4,732,343 A | 3/1988 | Maruyama |
| 4,957,317 A | 9/1990 | Jakubas |
| 5,186,197 A | 2/1993 | Lavine |
| 5,480,273 A | 1/1996 | Jou |
| 6,271,604 B1 * | 8/2001 | Frank et al. ................. 307/112 |
| 6,452,793 B1 * | 9/2002 | Boe ........................... 361/685 |

FOREIGN PATENT DOCUMENTS

JP 295515 10/2001

* cited by examiner

Primary Examiner—Hung Van Duong

(57) ABSTRACT

The present invention provides a mounting system for components in the housing of a computer server. The mounting system is preferably a height-adjustable thumb screw assembly, which allows for the components to be installed or removed without the use of tools. In a preferred embodiment, a thumb screw assembly capable of securing components to a chassis includes a screw and a gripping accessory. The screw preferably has a threaded portion, a shank portion, and a head portion, wherein a first groove extends along the shank portion and a second groove intersects the first groove under the head portion. The gripping accessory preferably has an outer gripping surface, a retaining socket, and a hub, wherein a grip is positioned inside the hub for matingly engaging the grooves of the screw.

8 Claims, 4 Drawing Sheets

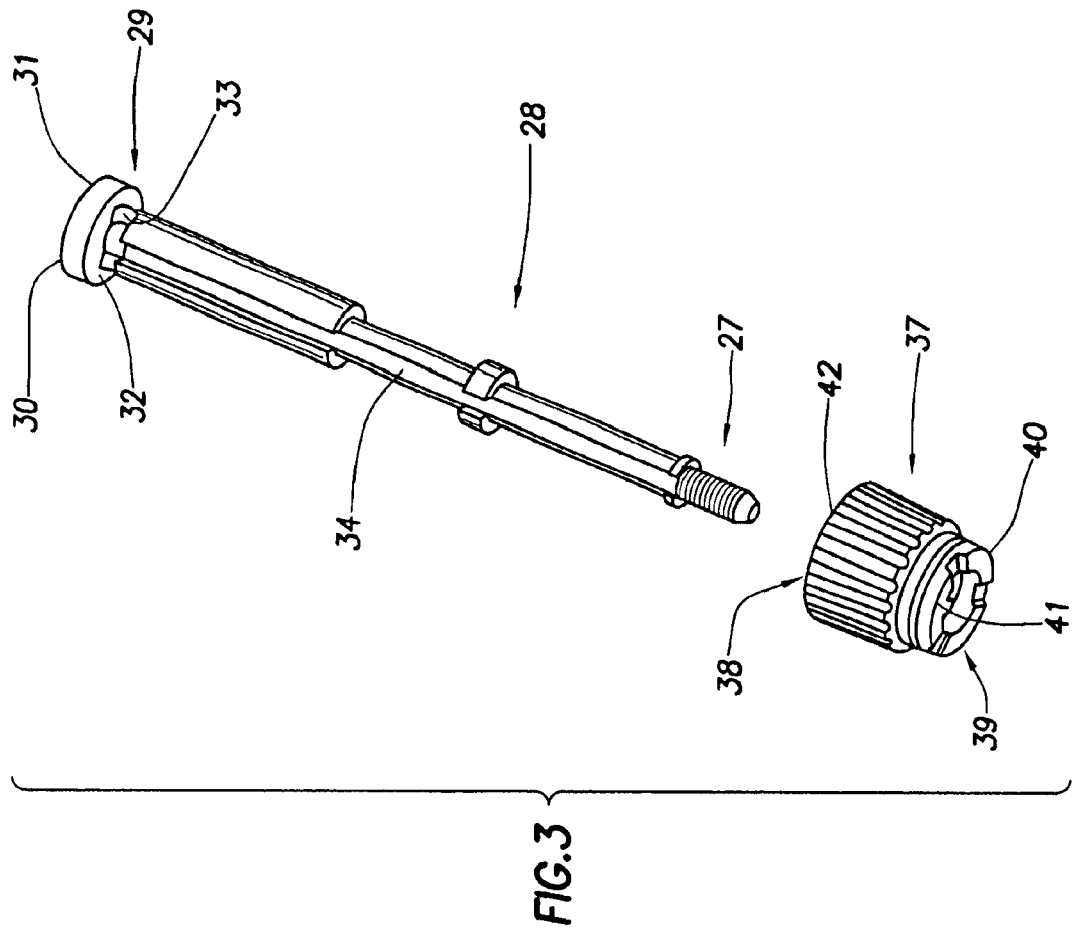
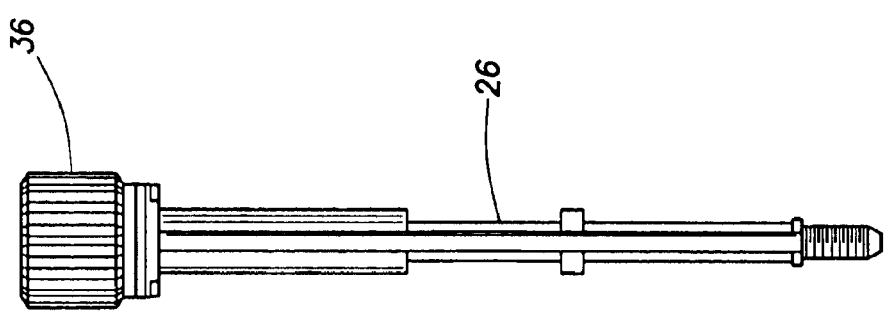

TOOLLESS THUMB SCREW WITH ADJUSTABLE HEIGHT KNOB

CROSS-REFERENCE TO RELATED APPLICATIONS

Not Applicable.

STATEMENT REGARDING FEDERALLY SPONSORED RESEARCH OR DEVELOPMENT

Not applicable.

BACKGROUND OF THE INVENTION

1. Field of the Invention

The present invention relates to a structural method of mounting components into a computer housing. More precisely, the present invention relates to a thumb screw assembly allowing the installation and removal of components in the computer housing, without the use of tools.

2. Background of the Relevant Art

The present invention relates to a fastener. It is particularly beneficial for securing components in a computer system such as a server. The following background and description of the preferred embodiments describes the fastener in that context. However, the scope of the preferred embodiments and the claims which follow should not be so limited, unless otherwise explicitly stated.

The necessity for specialized computer equipment has increased dramatically over recent years. Corporations, both large and small, as well as individual consumers have come to depend on computers to enhance and assist them in a broad assortment of tasks. For the individual or small business, personal computers are typically relatively compact and streamlined, often comprising a monitor, a keyboard, a mouse, and a CPU "box" that sits on a desktop or on the floor. These personal computers, although considered compact when deployed in relatively small numbers, can be quite cumbersome and bulky when deployed in larger quantities. It is not uncommon for an organization to require several computers to act as servers controlling their local area networks. For larger corporations that require numerous servers, the traditional CPU package is not practical to house servers. For such operations, an industry standard EIA (Electronics Industries Alliance) rack is often used to contain servers in a stacked arrangement that uses the available space more efficiently.

Such electronics racks are relatively simple structures that closely resemble an open-frame cabinet without shelves. Computer server/component racks are typically constructed with perforated, hinged front-doors, rigid sides and a removable rear panel. Industry standard 19" EIA electronics racks are designed typically to house a column of electronics packages that are 17¾" in width and with varying depths. The height of an electronics package can vary but, to be compatable with the rack mounting structure, must be an integer multiple of an EIA unit called simply the "U." An EIA U is 1.75 inches. Electronic equipment generally has a height in multiples of "Us" e.g., 1U (1.75"), 2U (3.50"), 3U (5.25"), etc. Although it is preferred that the height of the electronics components be a multiple of the standard EIA unit U, the dimension of the EIA unit is understood to represent a maximum allowable height, including both the height of the component and any clearance required. This amount of clearance aides in the installation of the rack mounted electronics and promotes interference free insertion and removal.

Typically, electronic components may be secured within the rack using a pair of drawer slides. The drawer slides, usually ball-bearing supported rails, are secured in place within the rack frame. Corresponding rails are located on the side surfaces of the electronics component to be mounted, thus allowing the component to be pulled in and out of the rack frame easily to allow quick and frequent access.

As the computing needs of both large and small businesses increase, there is increasing demand for computer servers to become smaller and more compact. This demand is coupled with the demand that the systems be easier to maintain and service. A typical server comprises at least one, and often more than one, of each of the following components: system board including processors and memory; power supplies; disk drives, including hard disks, floppy drives, CD-ROM drives, etc.; peripheral component interface (PCI) buses, and cooling fans. These components are typically manufactured separate from the computer housing or chassis, and then they are mounted in the computer chassis during final assembly.

Mounting all of these components in a densely packed server, some as small as 1U or 2U, creates many interface issues associated with maintaining and accessing the server. For example, the chassis may have a slot positioned to receive some components (e.g., a disk drive or CD-ROM drive), or the chassis may have a connector to receive other components (e.g., PCI assemblies). Several components may be coupled to the chassis with a bracket. When the component is a disk drive or a CD-ROM drive, the slot in the chassis receives the bracket to couple the component to the chassis. When the component is a PCI assembly (including PCI card and cage), the bracket may be secured to the chassis using fasteners.

One conventional method for installing a plurality of PCI assemblies in a computer chassis involves attaching a mounting bracket to each PCI assembly and then individually connecting each bracket to the chassis with a threaded fastener. Each threaded fastener passes through an aperture in the bracket and is secured in a threaded hole in the chassis to clamp the bracket to the chassis and restrict relative motion between the PCI assembly and the chassis. Such a method may be employed by a manufacturer of custom computers to produce computers that have various numbers of PCI assemblies.

One drawback with the foregoing approach is that the fasteners may accidentally fall into the spaces between neighboring assemblies and may be difficult to retrieve without removing the assemblies from the chassis.

Another drawback is that the installed fastener may not extend further than the tallest component (typically the PCI cage) due to chassis size constraints. As discussed above, there is increasing demand for servers to become smaller. Because the chassis is the frame, which holds the computer components, it is desirable for it to have a minimum height. However, the chassis size is limited by the tallest component (PCI cage) within it. As a result, the installed fastener is designed to sit flush with the surrounding components. In order to tighten the fastener in place, a fastening tool, such as a screwdriver, may be required to ensure that the fastener is fully secured and sits flush with its surrounding components. Although generally satisfactory, it would be even more desirable to operate the fastener without tools. Toolless installation is particularly desirable for large systems that require frequent service. The use of a tool is undesirable because it is inconvenient and may slip and damage the PCI assembly or other components during installation.

Therefore, there remains a need in the art for an arrangement that allows for easy installation and removal of components from a server computer without using any tools. The present invention overcomes the deficiencies of the prior art while focusing on these needs.

BRIEF SUMMARY OF THE INVENTION

The present invention overcomes the deficiencies of the prior art by providing a system to mount components in the housing of a computer server. The mounting system is preferably a thumb screw assembly, which allows for the components to be installed or removed without the use of tools.

In a preferred embodiment, a thumb screw assembly capable of securing components to a chassis includes a screw and a gripping accessory. The screw preferably has a threaded portion, a shank portion, and a head portion, wherein a first groove extends along the shank portion and a second groove intersects the first groove under the head portion. The gripping accessory preferably has an outer gripping surface, a retaining socket, and a hub, wherein a grip is positioned inside the hub for matingly engaging the grooves of the screw.

BRIEF DESCRIPTION OF THE DRAWINGS

For a more detailed description of the preferred embodiment of the present invention, reference will now be made to the accompanying drawings, wherein:

FIGS. 2 and 3 are perspective views of a thumb screw assembly in accordance with a preferred embodiment of the present invention;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

In order to fully describe the preferred embodiment of the present invention, reference will be made throughout this description to a computer server. The particular server referenced has a PCI cage mounted using one embodiment of the present invention. It is understood, however, that the principles and concepts of the present invention are not limited to use in a server, but is applicable to securing components in virtually any application and, in particular to space-limited applications. The scope of the invention is only limited by the claims and not by this description.

Figure 1:
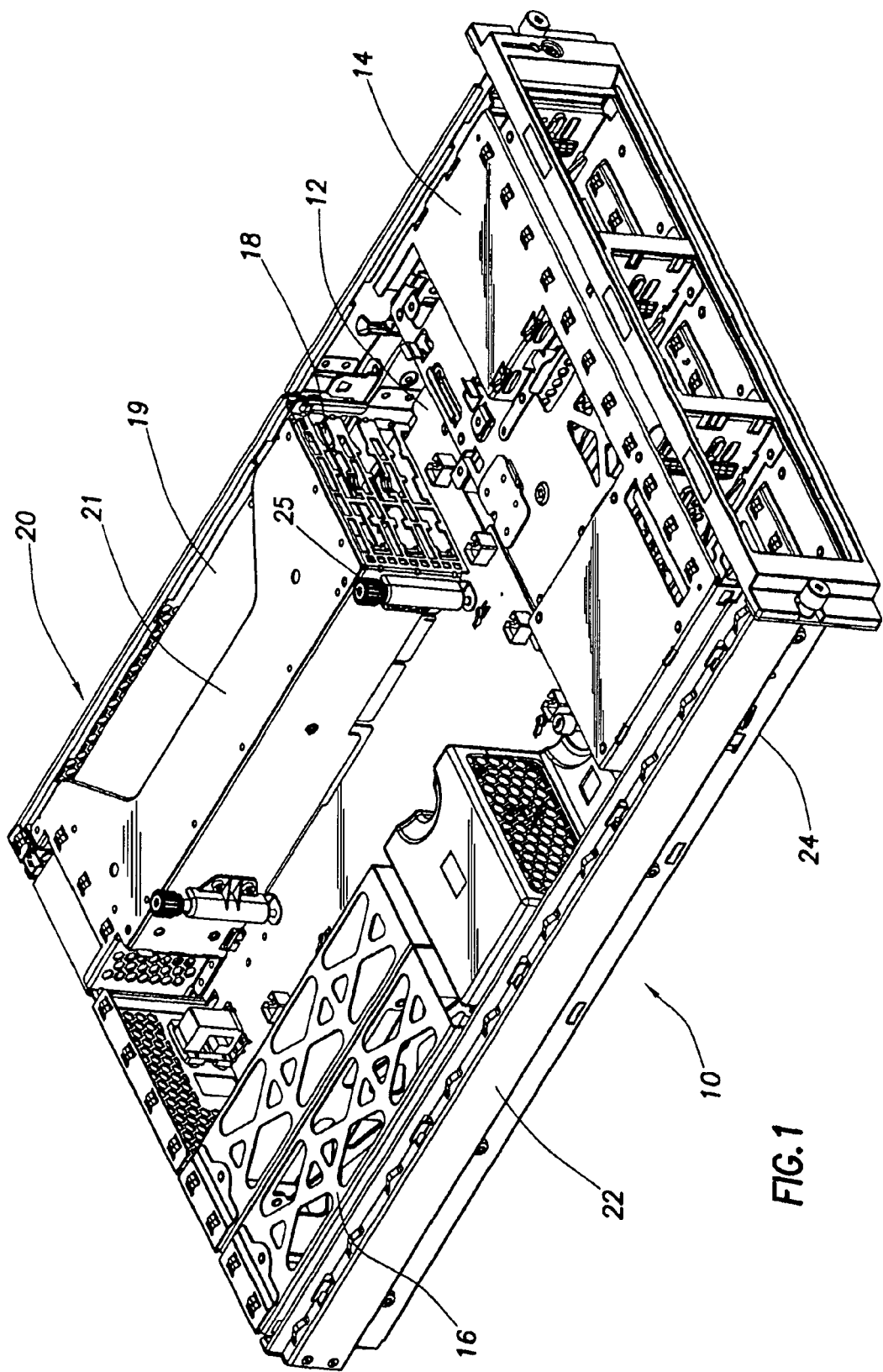
FIG. 1 a perspective view of a dense computer server in accordance with a preferred embodiment of the present invention.

FIG. 1 illustrates a server assembly 10 incorporating one embodiment of a thumb screw assembly 25. Server assembly 10 includes a chassis 24, a system board 12, disk drives 14, power supplies 16, and a circuit card assembly 19. Chassis 24 is preferably constructed from a hard resin or metal and serves as a housing for system board 12, disk drives 14, power supplies 16, and circuit card assembly 19. Circuit card assembly 19 includes at least one card 18 (e.g., a PCI card) and a cage 20. Cage 20 is roughly constructed from a casing 21, which is comprised of thin metal plates.

A slide rail 22 is located on either side of the chassis 24 and interfaces with the server cabinet (not shown). During normal operation, a cover (not shown) attaches to the chassis 24 fully enclosing the server assembly 10 and the assembly 10 is contained within a server cabinet. To perform maintenance on the server assembly 10, it is partially extended from the cabinet on rails 22, similar to opening a drawer. The cover is then removed to expose the internal components.

In a preferred embodiment, cage 20 is connected to chassis 24 via thumb screw assembly 25. Referring now to FIGS. 2 and 3, thumb screw assembly 25 includes a screw 26 and a gripping accessory 36, which may be formed of plastic, die-cast metal, or other suitable materials. Screw 26 includes a threaded portion 27, a shank portion 28, and a head portion 29. Head portion 29 has a peripheral surface 30 and a rounded edge 31. Typically in the manufacturing of screw 26, certain minor diameter tolerances are absorbed in the back draft portion 32. Screw 26 includes a small groove 33 under back draft portion 32 and a large groove 34 that intersects small groove 33 and travels down the length of screw 26.

Gripping accessory 36 includes an outer gripping surface 37, a retaining socket 38, and a hub 39. While the outer gripping surface 37 is shown in FIG. 3 as a beveled surface, it is contemplated that gripping surface 37 is not so limited. For example, gripping surface 37 may be a rigid, circular surface or a polygonal surface. Any change to gripping surface 37 should, however, be designed so as to facilitate the easy gripping and manipulation of gripping accessory 36.

In a preferred embodiment, hub 39 is concentrically positioned within the retaining socket 38 and is coaxial therewith. Hub 39, similar to the retaining socket 38, is integrally formed with the bottom surface 40 of gripping accessory 36. Positioned on the inside portion of hub 39 is a grip 41. In assembly, grip 41 matingly engages screw 26 by sliding into grooves 33 and 34.

Figure 4:
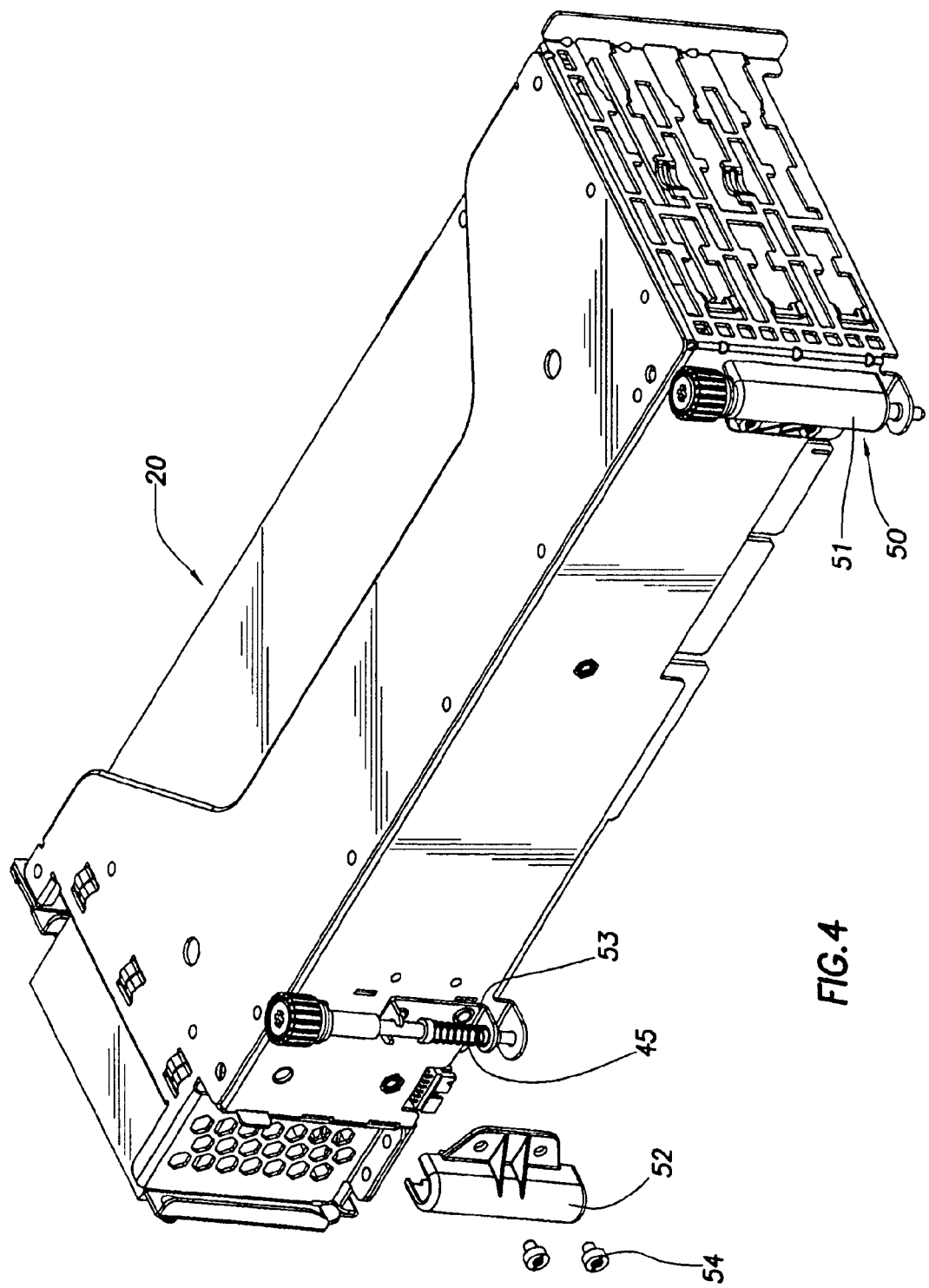
FIG. 4 is a perspective view of an installed thumb screw assembly in accordance with a preferred embodiment of the present invention.

Referring now to FIG. 4, the thumb screw assembly 25 is shown installed in chassis 24 adjacent to cage 20, securing cage 20 onto chassis 24 via mount 50. Mount 50 includes a mount body 51, having a main portion 52 and a bottom portion 53, connected by means 54 such as knobs, screws, or the like. Mount 50 is preferably assembled prior to installing thumb screw assembly 25. In a preferred embodiment, a spring 45 engagingly surrounds the shank 28 of thumb screw assembly 25, such that when pressure is applied to thumb screw assembly 25, it pushes back.

To install the thumb screw assembly 25, the gripping accessory 36 is extended to its maximum height. Grip 41 is forced into groove 33 and turned clockwise or counterclockwise to secure gripping accessory 36 in this extended position. Holding gripping surface 37, thumb screw assembly 25 is rotated clockwise, so that threaded portion 27 is secured into chassis 24 by a receiving zone (not shown). When threaded portion 27 is fully received, gripping accessory 36 is rotated so that grip 41 is forced into groove 34, allowing the gripping accessory 36 to be lowered so that its top surface 42 is flush with screw 26's head portion 29.

Figure 5C:
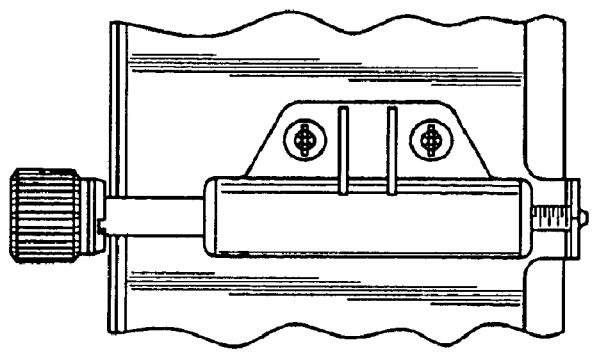
FIGS. 5a–5c are perspective views of a thumb screw assembly in accordance with a preferred embodiment in a variety of configurations.
Figure 5B:
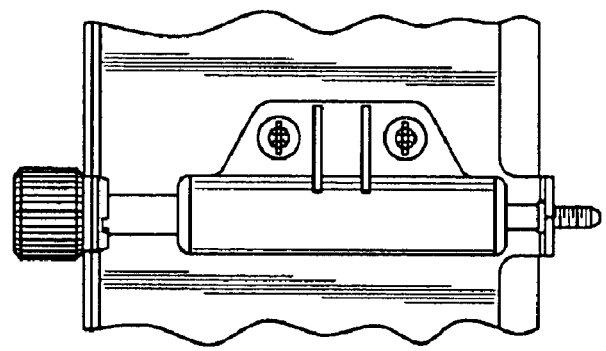
Figure 5A:
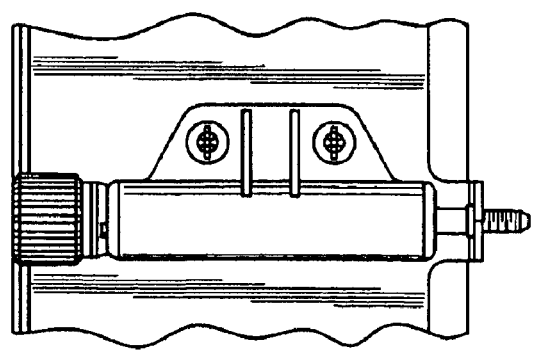

FIGS. 5a–5c show the thumb screw assembly 25 at a variety of stages. In FIG. 5a, the thumb screw assembly 25 is in the seated position (gripping accessory 36 is lowered). In FIG. 5b, the gripping accessory 36 is pulled up for hand access. In FIG. 5c, the thumb screw assembly 25 is in the unscrewed position. As can be seen, the present thumb screw assembly is height-adjustable, allowing it to be fully installed or removed without the use of tools, even when it is abutting another component, which would otherwise make it impossible to grip the screw.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A computer comprising:
   a chassis having a front panel, a first side panel, a second side panel, and a rear panel all mounted on a base and forming a rectangular enclosure;
   a system board attached to said chassis, said chassis having a receiving zone for a threaded fastener;
   at least one thumb screw assembly comprising a threaded screw with a groove and a gripping accessory with a grip for matingly engaging the screw in said groove;
   wherein said thumb screw assembly is received in said receiving zone.

2. The computer of claim 1 further including a spring engagingly surrounding said screw.

3. The computer of claim 1 wherein said thumb screw assembly is height-adjustable.

4. The computer of claim 1 wherein said thumb screw assembly can be engaged and disengaged without any tools.

5. A computer comprising:
   a chassis having a front panel, a first side panel, a second side panel, and a rear panel all mounted on a base and forming a rectangular enclosure;
   a system board attached to said chassis;
   a component; and
   a means for engaging and disengaging said component to said chassis;
   wherein said means comprises a shank having a groove formed longitudinal therein and a retaining notch and a gripping accessory which is disposed radially about said shank and can be moved longitudinally along at least a portion of said shank, said gripping accessory can be used to turn said shank by engaging said gripping accessory in said notch.

6. The computer of claim 5 further including a spring engagingly surrounding the shank.

7. The computer of claim 5 wherein said fastener can be engaged and disengaged without any tools.

8. The computer of claim 5 wherein the gripping accessory includes a grip, the grip engaging said notch.

* * * * *